United States Patent
Takagi et al.

(10) Patent No.: US 7,682,743 B2
(45) Date of Patent: Mar. 23, 2010

(54) BATTERY

(75) Inventors: Ryosuke Takagi, Fukushima (JP);
Naoko Yamakawa, Fukushima (JP);
Kenta Yamamoto, Kanagawa (JP)

(73) Assignee: Sony Corporation, Tokyo (JP)

(*) Notice: Subject to any disclaimer, the term of this patent is extended or adjusted under 35 U.S.C. 154(b) by 525 days.

(21) Appl. No.: 11/565,247

(22) Filed: Nov. 30, 2006

(65) Prior Publication Data
US 2007/0218357 A1    Sep. 20, 2007

(30) Foreign Application Priority Data
Nov. 30, 2005    (JP)    ................ 2005-346334

(51) Int. Cl.
*H01M 4/58*    (2010.01)
(52) U.S. Cl. .............. 429/221; 429/231.95; 429/60
(58) Field of Classification Search ............ None
See application file for complete search history.

(56) References Cited

U.S. PATENT DOCUMENTS

2005/0191545 A1* 9/2005 Bowles et al. ............ 429/127
2008/0076022 A1* 3/2008 Marple ..................... 429/164

FOREIGN PATENT DOCUMENTS

JP  56-79859   *  6/1981
JP  3060109       4/2000

* cited by examiner

*Primary Examiner*—John S Maples
(74) *Attorney, Agent, or Firm*—K&L Gates LLP

(57) ABSTRACT

A battery capable of improving the constant output discharge capacity is provided. A battery includes a cathode, an anode, and an electrolyte. The cathode contains iron sulfide. The anode contains lithium metal or a lithium alloy. A ratio of a discharge capacity per unit area of the cathode to a discharge capacity per unit area of the anode (the discharge capacity per unit area of the cathode/the discharge capacity per unit area of the anode) is more than 1 and 1.4 or less.

2 Claims, 2 Drawing Sheets

BATTERY

CROSS REFERENCES TO RELATED APPLICATIONS

The present application claims priority to Japanese Patent Application JP 2005-346334 filed in the Japanese Patent Office on Nov. 30, 2005, the entire contents of which is being incorporated herein by reference.

BACKGROUND

The present disclosure relates to a battery in which iron sulfide is used for the cathode and lithium (Li) metal or a lithium alloy is used for the anode.

Various batteries using lithium metal for the anode have been heretofore developed. One thereof is a lithium iron sulfide battery using iron sulfide for the cathode (for example, see Japanese Patent No. 3060109). The lithium iron sulfide battery is compatible with alkaline batteries, and thus the lithium iron sulfide battery is expected to be widely used. In addition, an AAA lithium iron sulfide battery has an average discharging voltage of about 0.2 V higher than that of the alkaline battery, and thus the AAA lithium iron sulfide battery has superior long-lasting use of about 15% over that of the alkaline battery in the case of constant output discharge. Further, the lithium iron sulfide battery has a spirally winding structure in which the cathode and the anode are layered and spirally wound unlike the alkaline battery. Therefore, the lithium iron sulfide battery has superior heavy load discharge characteristics. For example, when the lithium iron sulfide battery is used for a digital camera, it is possible to increase number of shots by more than double that of the alkaline battery.

However, the capacity of the lithium iron sulfide battery is slightly inferior to that of the alkaline battery. Therefore, for example, in the case of light load discharge in a headphone stereo set or the like, it is difficult for the lithium iron sulfide battery to gain superiority to the alkaline battery. It is considered that by increasing the electrode thickness, the amount of active material filled in the battery is increased to improve the capacity. However, when the electrode thickness is increased, the heavy load characteristics are lowered.

In view of the foregoing, it is desirable to provide a battery capable of improving the discharge capacity while maintaining the high load characteristics.

SUMMARY

According to an embodiment, there is provided a battery including a cathode, an anode, and an electrolyte, wherein the cathode contains iron sulfide, the anode contains lithium metal or a lithium alloy, and a ratio of a discharge capacity per unit area of the cathode to a discharge capacity per unit area of the anode (the discharge capacity per unit area of the cathode/ the discharge capacity per unit area of the anode) is more than 1 and 1.4 or less.

According to the battery of the embodiment of the invention, the ratio of the discharge capacity per unit area of the cathode to the discharge capacity per unit area of the anode is more than 1 and 1.4 or less. Therefore, the discharge potential of the cathode during the end stage of discharge is prevented from being decreased, the average discharging voltage can be increased, and the battery capacity per unit volume can become appropriate. Consequently, the constant output discharge capacity can be improved while maintaining the high load characteristics.

Other and further objects, features and advantages of the invention will appear more fully from the following description.

Additional features and advantages are described herein, and will be apparent from, the following Detailed Description and the figures.

DETAILED DESCRIPTION

An embodiment is hereinafter described in detail with reference to the drawings.

Figure 1:
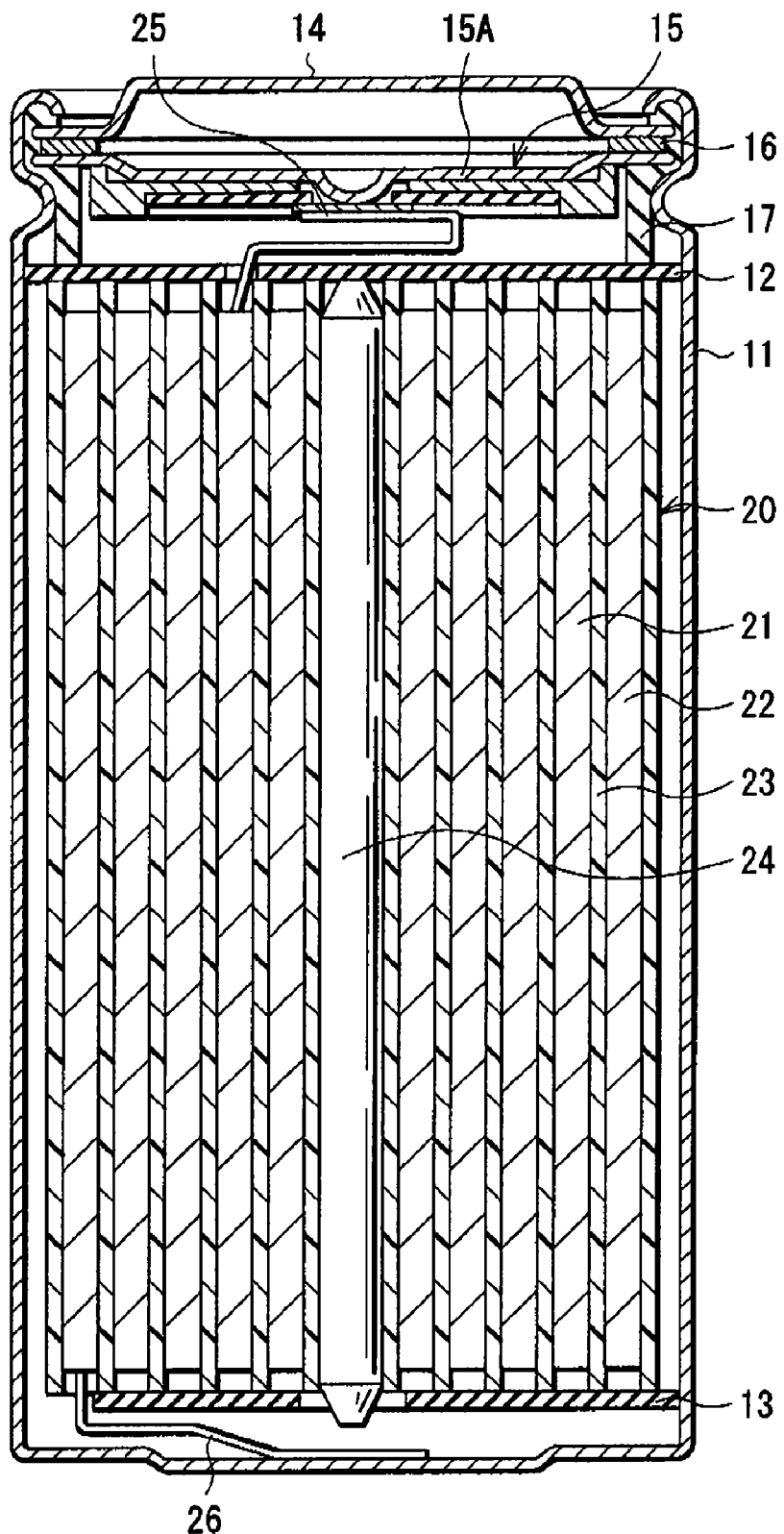
FIG. 1 is a cross section showing a structure of a battery according to an embodiment.

FIG. 1 shows a cross sectional structure of a battery according to an embodiment. The battery has a battery element 20 inside a battery can 11 in the shape of an approximately hollow cylinder. In the height direction of the battery can 11, a pair of insulating plates 12 and 13 is arranged so that the battery element 20 is sandwiched between the insulating plates 12 and 13. One end of the battery can 11 is closed, and the other end is opened. At the open end of the battery can 11, a battery cover 14, and a safety valve mechanism 15 and a PTC (Positive Temperature Coefficient) device 16 provided inside the battery cover 14 are attached by being caulked with a gasket 17. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the battery element 20. When temperature rises, the PTC device 16 limits a current by increasing the resistance value to prevent abnormal heat generation due to a large current. The gasket 17 is made of, for example, an insulating material.

The battery element 20 has a spirally winding structure in which a cathode 21 and an anode 22 are layered and spirally wound with a separator 23 in between. A center pin 24 is inserted in the center of the battery element 20. A cathode lead 25 made of aluminum (Al) or the like is connected to the cathode 21. The cathode lead 25 is electrically connected to the battery cover 14 by being connected to the safety valve mechanism 15. An anode lead 26 made of nickel (Ni) or the like is connected to the anode 22. The anode lead 26 is electrically connected to the battery can 11.

The cathode 21 has a structure in which, for example, a cathode active material layer is provided on the both faces of a cathode current collector made of a metal foil. The cathode active material layer contains, as a cathode active material, iron sulfide. If necessary, the cathode active material layer may contain an electrical conductor such as a carbon material and a binder such as polyvinylidene fluoride. The composition of iron sulfide is preferably, for example, $FeS_2$, and more preferably pyrite. The anode 22 is made of, for example, a lithium metal foil or a lithium alloy foil. As an anode active material, the anode 22 contains lithium or a lithium alloy.

In the battery, the ratio R of the discharge capacity per unit area of the cathode 21 to the discharge capacity per unit area of the anode 22 (the discharge capacity per unit area of the cathode 21/the discharge capacity per unit area of the anode 22) is adjusted to more than 1 and 1.4 or less. When iron sulfide is used for the cathode 21, during the end stage of discharge, there is a region where the discharge potential of the cathode 21 is largely decreased. It is possible not to utilize such region by increasing the ratio R, and thus the average discharge voltage can be increased. However, when the ratio R is excessively increased, the necessary volume for the same capacity is increased, and the battery capacity per unit volume is decreased. A more preferable range of the ratio R is 1.1 or more and 1.4 or less.

The ratio R is obtained by Mathematical formula 1 with the discharge capacity per unit area remaining in the cathode 21 (referred to as unit cathode remaining capacity SCC), the discharge capacity per unit area remaining in the anode 22 (referred to as unit anode remaining capacity SCA), and the lithium capacity per unit area inserted in the cathode 21 (referred to as unit insertion capacity PDR).

$$\text{Ratio } R = (\text{unit cathode remaining capacity } SCC + \text{unit insertion capacity } PDR)/(\text{unit anode remaining capacity } SCA + \text{unit insertion capacity } PDR) \quad \text{Mathematical formula 1}$$

The unit cathode remaining capacity SCC is obtained by, for example, Mathematical formula 2 with the area of the cathode active material layer in the region of the cathode 21 opposed to the anode 22 (referred to as cathode area $SA_{ca}$) and the capacity remaining in the cathode active material layer in the region of the cathode 21 opposed to the anode 22 (referred to as cathode remaining capacity $C_{ca}$) after disassembling the battery and taking out the cathode 21. The cathode remaining capacity $C_{ca}$ is obtained by, for example, peeling the cathode active material layer in the region of the cathode 21 opposed to the anode 22, forming a test cathode using part of the peeled cathode active material layer, assembling a coin type test battery using a lithium metal plate as a counter electrode and the electrolytic solution taken out from the disassembled battery as an electrolytic solution, and discharging at the constant current of 0.3 mA until 0.5 V.

$$\text{Unit cathode remaining capacity } SCC(\text{mAh/mm}^2) = \text{cathode remaining capacity } C_{ca}(\text{mAh})/\text{cathode area } (\text{mm}^2) \quad \text{Mathematical formula 2}$$

The unit insertion capacity PDR is obtained by, for example, Mathematical formula 3 with the weight of the cathode active material layer in the region of the cathode 21 opposed to the anode 22 (referred to as cathode weight $W_{ca}$), the lithium amount contained in the cathode active material layer in the region of the cathode 21 opposed to the anode 22 (referred to as cathode lithium amount $PD_{Li}$), the capacity per unit weight of lithium 3680 (mAh/g), and the cathode area $SA_{ca}$. The cathode lithium amount $PD_{Li}$ can be measured by, for example, as follows. That is, part of the peeled cathode active material layer is dissolved in an acid, and measurement is made by ICP-AES (Inductively Coupled Plasma-Atomic Emission Spectroscopy) or the like.

$$\text{Unit insertion capacity } PDR(\text{mAh/mm}^2) = \text{cathode weight } W_{ca}(\text{g}) \times \text{cathode Li amount } PD_{Li} (\text{wt \%}) \times 3680 \,(\text{mAh/g})/\text{cathode area } (\text{mm}^2) \quad \text{Mathematical formula 3}$$

The unit anode remaining capacity SCA is obtained by, for example, Mathematical formula 4 with the area of the region of the anode 22 opposed to the cathode active material layer (referred to as anode area $SA_{Li}$), the weight of the region of the anode 22 opposed to the cathode active material layer (referred to as anode weight $W_{Li}$), the lithium amount contained in the region of the anode 22 opposed to the cathode active material layer (referred to as anode lithium amount $P_{Li}$), and the capacity per unit weight of lithium 3680 (mAh/g) after disassembling the battery and taking out the anode 22. The anode lithium amount $P_{Li}$ can be measured by, for example, as follows. That is, part of the anode 22 is dissolved in an acid, and measurement is made by ICP-AES or the like.

$$\text{Unit anode remaining capacity } SCA(\text{mAh/mm}^2) = \text{anode weight } W_{Li}(\text{g}) \times \text{anode Li amount } P_{Li} (\text{wt \%}) \times 3680 \,(\text{mAh/g})/\text{anode area } (\text{mm}^2) \quad \text{Mathematical formula 4}$$

The separator 23 is made of, for example, a porous film made of a polyolefin material such as polypropylene and polyethylene, or a porous film made of an inorganic material such as a ceramics nonwoven. The separator 23 may have a structure in which two or more of the foregoing porous films are layered.

An electrolytic solution, which is a liquid electrolyte, is impregnated in the separator 23. The electrolytic solution contains, for example, a solvent and a lithium salt as an electrolyte salt. As a solvent, for example, a nonaqueous solvent such as propylene carbonate, ethylene carbonate, diethyl carbonate, dimethyl carbonate, ethyl methyl carbonate, vinylene carbonate, acetonitrile, tetrahydrofuran, 2-methyl tetrahydrofuran, 1,3-dioxolane, 2-methyl-1,3-dioxolane, diethyl ether, N-methyl-2-pyrrolidone, and tetrahydropyran can be cited. One of the solvents may be used singly, or two or more thereof may be used by mixing.

As a lithium salt, for example, LiI, LiClO$_4$, LiAsF$_6$, LiPF$_6$, LiBF$_4$, LiN[CF$_3$SO$_2$]$_2$, lithium difluoro[oxalato-O,O']borate, or lithium bis[oxalato-O,O']borate can be cited. One of the lithium salts may be used singly, or two or more thereof may be used by mixing.

The battery can be manufactured, for example, as follows. The cathode 21 and the anode 22 are layered and spirally wound with the separator 23 in between. After that, the resultant spirally wound body is contained into the battery can 11, the electrolytic solution is injected into the battery can 11, and the battery cover 14 is fitted thereinto. At this time, the ratio R of the discharge capacity per unit area of the cathode 21 to the discharge capacity per unit area of the anode 22 is adjusted to more than 1 and 1.4 or less as described above.

In the secondary battery, when discharged, lithium becomes lithium ions which are eluted from the anode 22, and inserted in the cathode 21 through the electrolytic solution. In this embodiment, the discharge capacity per unit area of the cathode 21 is larger than the discharge capacity per unit area of the anode 22. Therefore, even during the end stage of discharge, the discharge potential of the cathode 21 is prevented from being decreased largely.

As above, in this embodiment, the ratio R of the discharge capacity per unit area of the cathode 21 to the discharge capacity per unit area of the anode 22 is more than 1 and 1.4 or less. Therefore, the discharge potential of the cathode 21 during the end stage of discharge is prevented from being decreased, the average discharging voltage can be increased, and the battery capacity per unit volume can become appropriate. Consequently, the constant output discharge capacity can be improved while maintaining the high load characteristics.

EXAMPLES

Further, specific examples are described in detail.

Examples 1 to 4

First, iron sulfide powder, graphite as an electrical conductor, and polyvinylidene fluoride as a binder were mixed at the weight ratio of iron sulfide:graphite:polyvinylidene fluoride=90:5:5. The resultant mixture is dispersed in a disperse medium and applied to the both faces of the cathode current collector made of an aluminum foil, which was compression-molded to form the cathode active material layer, and thereby forming the cathode 21. Next, the cathode lead 25 made of aluminum was attached to the cathode 21.

Further, as the anode 22, a lithium metal foil was prepared and the anode lead 26 made of nickel was attached to the anode 22. In Examples 1 to 4, the thickness of the cathode active material layer and the thickness of the anode 22 were adjusted so that the ratio R of the discharge capacity per unit area of the cathode 21 to the discharge capacity per unit area of the anode 22 became 1.1, 1.2, 1.3 or 1.4 as shown in Table 1.

Subsequently, the cathode 21 and the anode 22 were layered and spirally wound with the separator 23 in between. After that, the spirally wound body was sandwiched between the pair of insulating plates 12 and 13. Then the anode lead 26 was attached to the battery can 11, and the resultant spirally wound body was contained into the battery can 11. After that, an electrolytic solution was injected into the battery can 11, and the cathode lead 25 was attached to the safety valve mechanism 15. Then, the safety valve mechanism 15, the PTC device 16, and the battery cover 14 were fixed on the battery can 11. For the electrolytic solution, an electrolytic solution obtained by dissolving LiI at a ratio of 0.9 mol/l in a mixed solvent of dimethyl carbonate and 1,3-dioxolane at the weight ratio of 1:1 was used. Thereby, the batteries shown in FIG. 1 were obtained for Examples 1 to 4.

As Comparative examples 1 to 4 relative to Examples 1 to 4, batteries were fabricated as in Examples 1 to 4, except that the ratio R of the discharge capacity per unit area of the cathode 21 to the discharge capacity per unit area of the anode 22 was adjusted to 0.9, 1.0, 1.5, or 1.6 as shown in Table 1.

Figure 2:
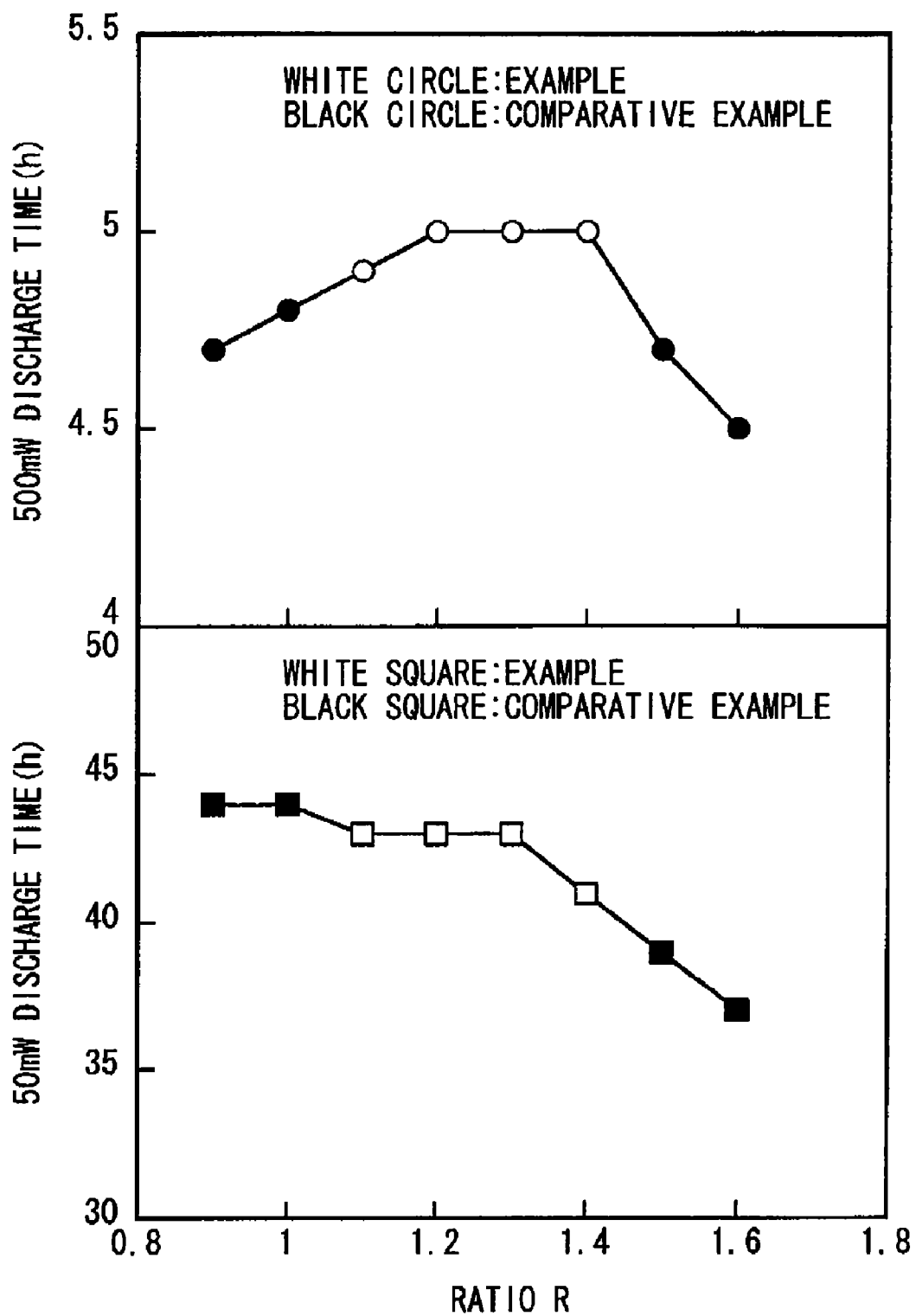
FIG. 2 is a characteristics diagram showing a relation between the ratio R and the discharge time.

For the fabricated batteries of Examples 1 to 4 and Comparative examples 1 to 4, discharge was performed at the constant current of 500 mA or 50 mA, and the discharge time until the battery voltage reached 1.0 V was measured. The results obtained are shown in Table 1 and FIG. 2.

TABLE 1

| | | Discharge time (hour) | |
|---|---|---|---|
| | Ratio R | 500 mW | 50 mW |
| Example 1 | 1.1 | 4.9 | 43 |
| Example 2 | 1.2 | 5 | 43 |
| Example 3 | 1.3 | 5 | 43 |
| Example 4 | 1.4 | 5 | 41 |
| Comparative example 1 | 0.9 | 4.7 | 44 |
| Comparative example 2 | 1.0 | 4.8 | 44 |
| Comparative example 3 | 1.5 | 4.7 | 39 |
| Comparative example 4 | 1.6 | 4.5 | 37 |

As shown in Table 1, in the case of the light load discharge of 50 mA, there was a tendency that as the ratio R was increased, the discharge time was shortened. However, in the case of the heavy load discharge of 500 mA, there was a tendency that as the ratio R was increased, the discharge time became longer, showed the maximum value, and then was shortened. That is, it was found that when the ratio R was more than 1 and 1.4 or less, preferably, was 1.1 or more and 1.4 or less, the constant output discharge capacity could be improved.

The invention has been described with reference to the embodiment and the examples. However, the invention is not limited to the foregoing embodiment and the foregoing examples, and various modifications may be made. For example, in the foregoing embodiment and the foregoing examples, descriptions have been given of the case using iron sulfide as a cathode active material. However, other cathode active material may be used in addition to iron sulfide.

Further, in the foregoing embodiment and the foregoing examples, descriptions have been given of the case in which the anode 22 was made of the lithium metal foil or the lithium alloy foil. However, an anode active material layer made of lithium metal or a lithium alloy may be formed on an anode current collector. In this case, "region of the cathode opposed to the anode" used when obtaining the ratio R means "region of the cathode opposed to the anode active material layer," and "region of the anode opposed to the cathode active material layer" means "region of the anode active material layer opposed to the cathode active material layer."

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
 a cathode;
 an anode; and
 an electrolyte,
 wherein the cathode contains iron sulfide,
 the anode contains lithium metal or a lithium alloy, and
 a ratio of a discharge capacity per unit area of the cathode to a discharge capacity per unit area of the anode is greater than 1 and 1.4 or less.

2. The battery according to claim 1, wherein the ratio of the discharge capacity per unit area of the cathode to the discharge capacity per unit area of the anode is 1.1 or more and 1.4 or less.

* * * * *